(12) United States Patent
Liu et al.

(10) Patent No.: US 11,646,529 B2
(45) Date of Patent: May 9, 2023

(54) CHARGING GUN AND STRAIN RELIEF STRUCTURE THEREOF

(71) Applicant: Delta Electronics, Inc., Taoyuan (TW)

(72) Inventors: Chia-Yang Liu, Taoyuan (TW); Hung-Sheng Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 53 days.

(21) Appl. No.: 17/347,146

(22) Filed: Jun. 14, 2021

(65) Prior Publication Data
US 2022/0140526 A1 May 5, 2022

(30) Foreign Application Priority Data
Nov. 2, 2020 (CN) .......................... 202011205427.7

(51) Int. Cl.
*H01R 13/58* (2006.01)
*B60L 53/16* (2019.01)

(52) U.S. Cl.
CPC .......... *H01R 13/5812* (2013.01); *B60L 53/16* (2019.02); *H01R 2201/26* (2013.01)

(58) Field of Classification Search
CPC ............ H01R 13/5812; H01R 2201/26; H01R 13/58; B60L 53/16
See application file for complete search history.

(56) References Cited

U.S. PATENT DOCUMENTS

| | | | |
|---|---|---|---|
| 9,793,642 B2 * | 10/2017 | Natter | B60L 53/31 |
| 9,825,445 B2 | 11/2017 | Metzler et al. | |
| 10,290,970 B1 | 5/2019 | Weber, Jr. et al. | |
| 2013/0052853 A1 | 2/2013 | Natter et al. | |
| 2015/0147919 A1 | 5/2015 | Seelig et al. | |
| 2016/0315414 A1 | 10/2016 | Defibaugh et al. | |

FOREIGN PATENT DOCUMENTS

| | | | |
|---|---|---|---|
| CN | 101098061 A | 1/2008 | |
| CN | 104428967 A | 3/2015 | |
| CN | 110654257 A | 1/2020 | |
| EP | 2816672 A1 * | 12/2014 | H01R 13/5812 |
| TW | M536429 U | 2/2017 | |
| TW | 201921812 A | 6/2019 | |

* cited by examiner

*Primary Examiner* — Briggitte R. Hammond
(74) *Attorney, Agent, or Firm* — Kirton McConkie; Evan R. Witt

(57) ABSTRACT

The present disclosure provides a charging gun including a cable, an outer casing and a strain relief structure. The outer casing includes a first case and a second case, wherein the first case is detachably assembled with the second case. The strain relief structure includes a first portion, a second portion and a plurality of first ring-shaped protrusions. The first portion is detachably assembled with the second portion, the first portion is disposed on the first housing, and the second portion is disposed on the second housing. When the first case is assembled and connected with the second case, the first portion is assembled and connected with the second portion, and at least a part of a surface of the cable is covered by the strain relief structure, and the strain relief structure is clamped between the cable and the outer casing.

12 Claims, 5 Drawing Sheets

CHARGING GUN AND STRAIN RELIEF STRUCTURE THEREOF

CROSS-REFERENCE TO RELATED APPLICATION

This application claims priority to China Patent Application No. 202011205427.7, filed on Nov. 2, 2020. The entire contents of the above-mentioned patent application are incorporated herein by reference for all purposes.

FIELD OF THE INVENTION

The present disclosure relates to a charging equipment, and more particularly to a charging gun having a strain relief structure.

BACKGROUND OF THE INVENTION

Generally speaking, the charging equipment includes a charging gun and a power supply device, the charging gun is in connection with the power supply device, so that an external device can be charged by the power supply device through the charging gun. A cable of the charging gun (e.g. power cable) is usually bent while using, and the cable near the connection terminal may be broken due to excessive stress.

At present, there are many charging guns having a strain relief structure near the connection terminal of the cable. The traditional strain relief structure is an integrally-formed ring-shaped structure and arranged around the cable. However, the above-mentioned cables are usually inserted into the strain relief structure by manual assembly, and a lubricating oil must be applied to the inner edge of the strain relief structure before assembling for reducing the friction, which results in time-consuming and inconvenient assembly, low producing efficiency and poor waterproof effect.

Therefore, there is a need of providing an improved charging gun and the strain relief structure thereof to obviate the drawbacks of the prior art.

SUMMARY OF THE INVENTION

It is an object of the present disclosure to provide a charging gun having a strain relief structure, which achieves the advantages of simplifying the process of production, saving time-cost of manually assembling, enhancing the efficiency and stability of production, and enhancing the effect of waterproof.

It is an object of the present disclosure to provide a charging gun. The charging gun includes a cable, an outer casing and a strain relief structure. The cable has a surface. The outer casing includes a first case and a second case, wherein the first case is detachably assembled with the second case. The strain relief structure includes a first portion and a second portion, wherein the first portion is detachably assembled with the second portion, the first portion is disposed on a first inner wall of the first case, and the second portion is disposed on a second inner wall of the second case. When the first case is assembled and connected with the second case, the first portion is assembled and connected with the second portion, the first portion covers on at least a part of the surface of the cable, the second portion covers on at least a part of the surface of the cable, and the strain relief structure is clamped between the cable and the outer casing.

It is another object of the present disclosure to provide a strain relief structure for a charging gun. The charging gun includes a cable and an outer casing. The outer casing includes a first case and a second case, the first case is detachably assembled with the second case. The strain relief structure includes a first portion, a second portion and a plurality of first ring-shaped protrusions. The second portion detachably assembled with the first portion. The plurality of first ring-shaped protrusions disposed on the first portion and the second portion. The first portion is assembled and connected with the second portion, the first portion covers on at least a part of a surface of the cable, the second portion covers on at least a part of the surface of the cable, and the plurality of first ring-shaped protrusions are detachably attached on the surface of the cable.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
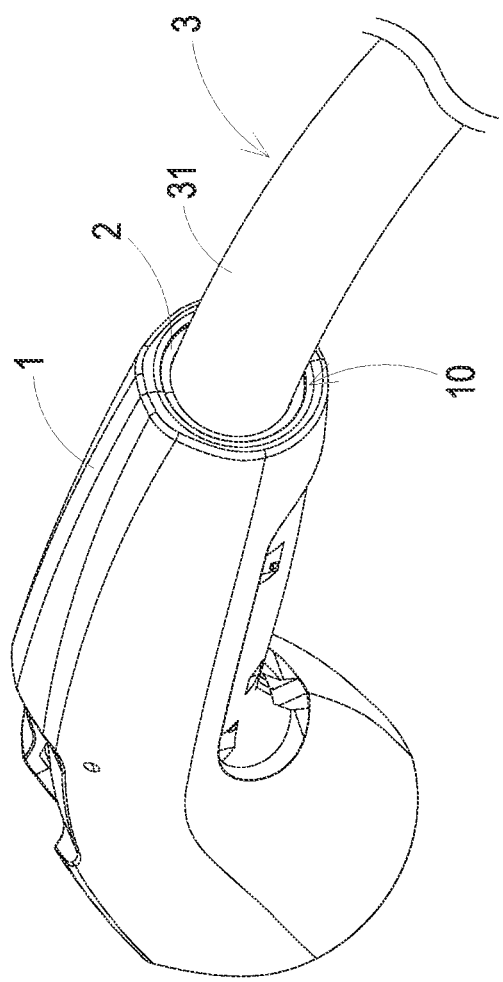
FIG. 1 is a schematic perspective view illustrating a charging gun according to an embodiment of the present disclosure.
Figure 2:
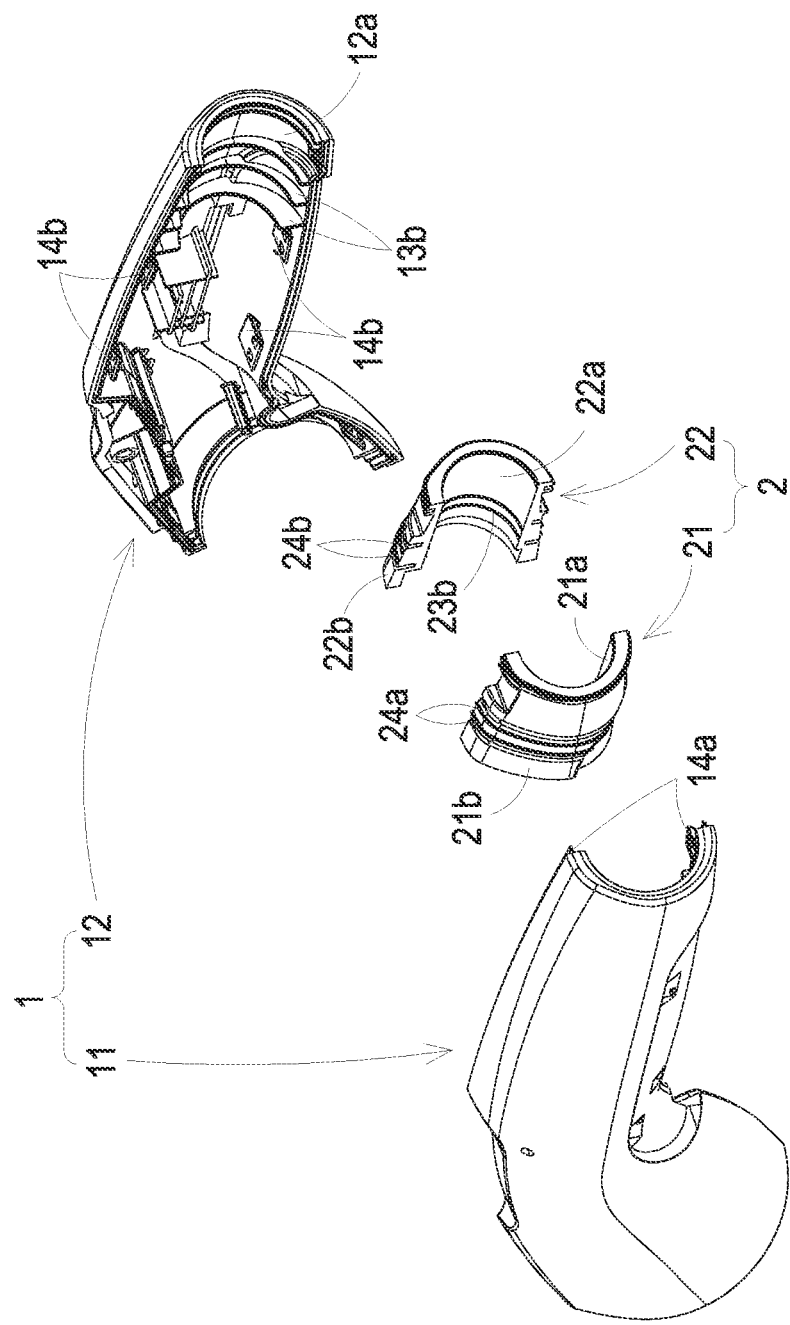
FIG. 2 is a schematic exploded view illustrating an outer casing and a strain relief structure of the charging gun of FIG. 1.
Figure 3:
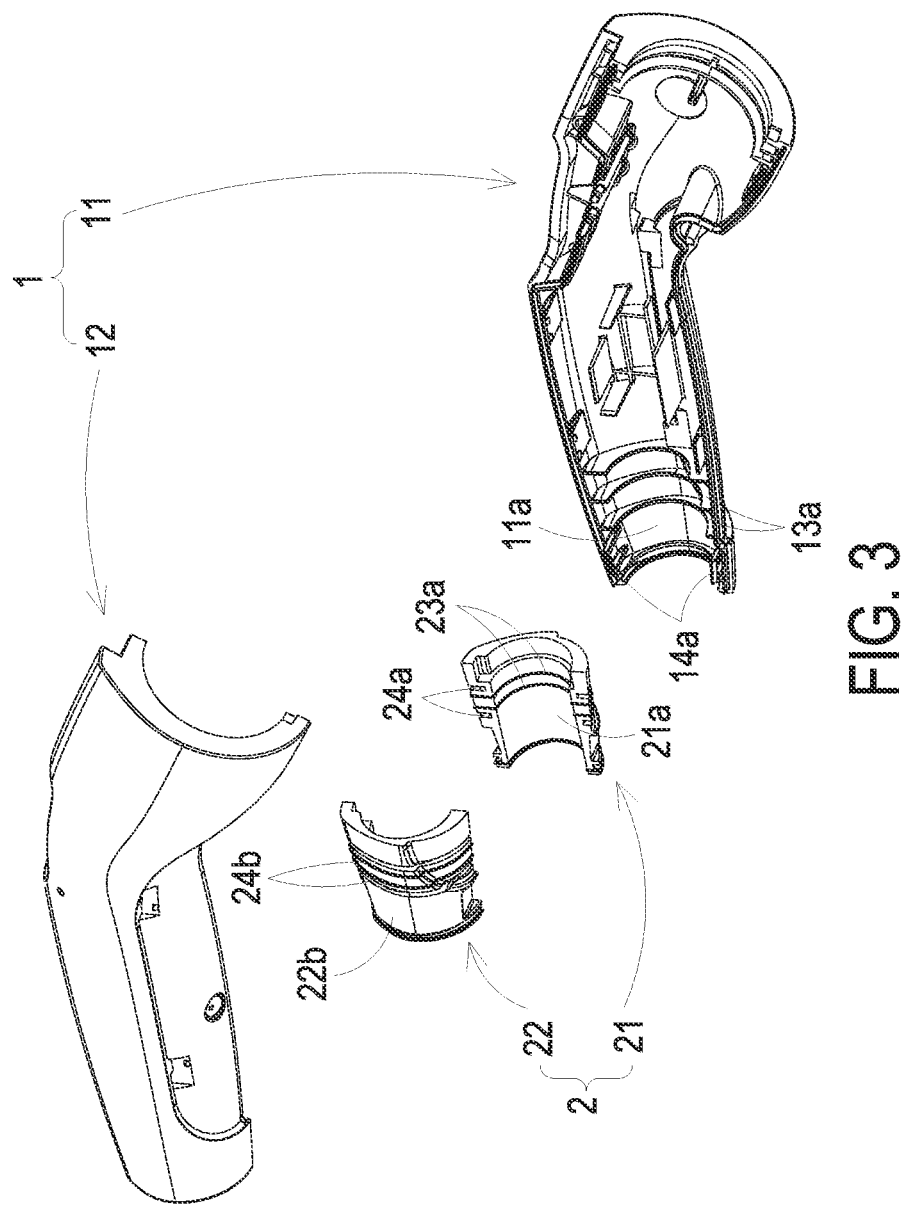
FIG. 3 is another schematic perspective view illustrating the charging gun of FIG. 1.
Figure 4:
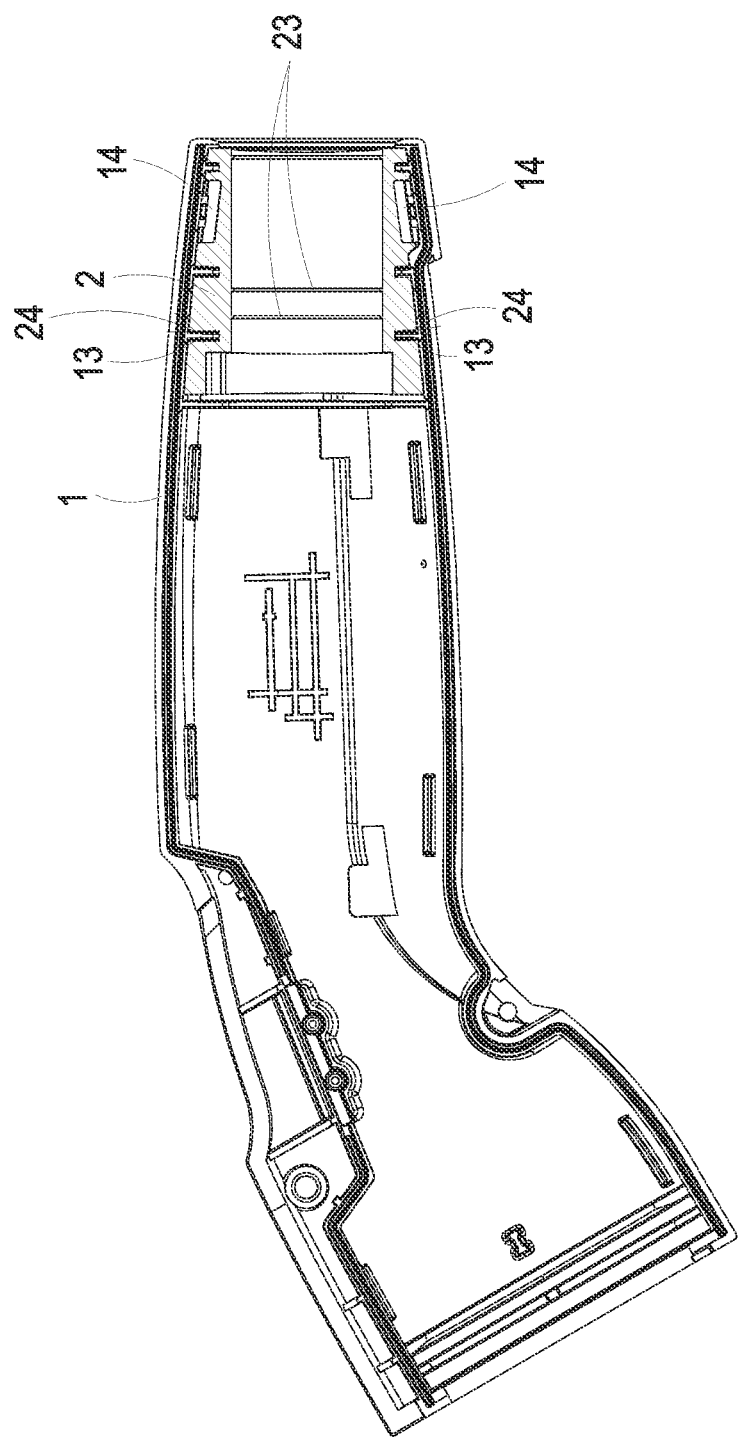
FIG. 4 is a schematic cross-sectional view illustrating the outer casing and the strain relief structure of the charging gun of FIG. 1.
Figure 5:
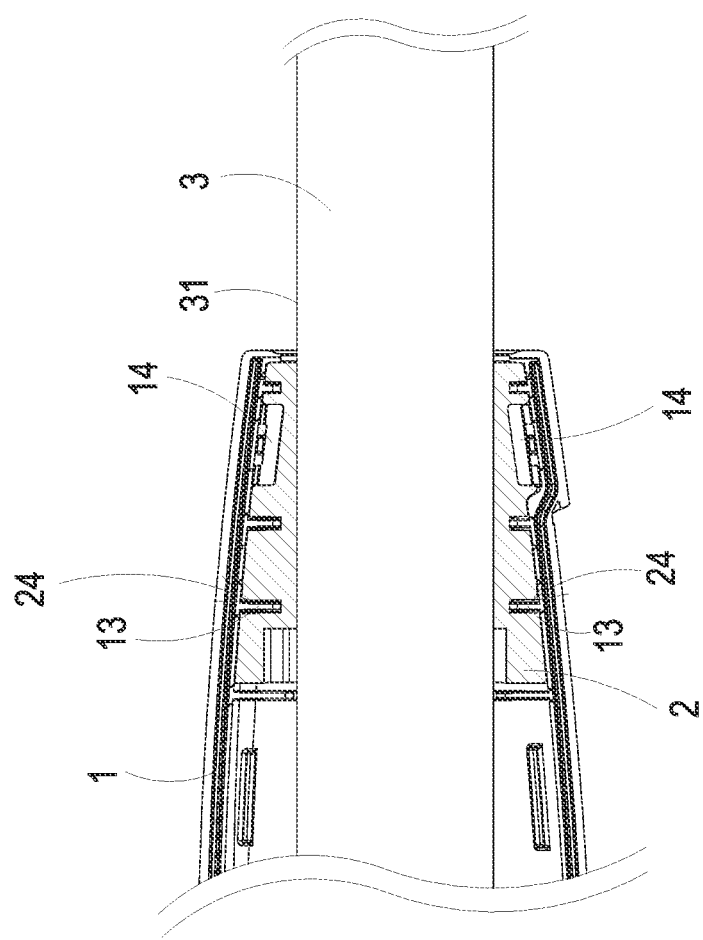
FIG. 5 is a schematic cross-sectional view illustrating the charging gun of FIG. 1.

Please refer to FIGS. 1 to 5, wherein FIG. 1 is a schematic perspective view illustrating a charging gun according to an embodiment of the present disclosure; FIG. 2 is a schematic exploded view illustrating an outer casing and a strain relief structure of the charging gun of FIG. 1; FIG. 3 is another schematic perspective view illustrating the charging gun of FIG. 1; FIG. 4 is a schematic cross-sectional view illustrating the outer casing and the strain relief structure of the charging gun of FIG. 1; and FIG. 5 is a schematic cross-sectional view illustrating the charging gun of FIG. 1. In the present embodiment, the charging gun 100 includes an outer casing 1, a strain relief structure 2 and a cable 3. The cable 3 has a surface 31. The outer casing 1 includes a first case 11 and a second case 12, wherein the first case 11 is detachably assembled with the second case 12. The strain relief structure 2 includes a first portion 21, a second portion 22 and a plurality of first ring-shaped protrusions 23. The first portion 21 is detachably assembled with the second portion 22, the first portion 21 is disposed on a first inner wall 11a of the first case 11 (as shown in FIG. 3), and the second portion 22 is disposed on a second inner wall 12a of the second case 12. The plurality of first ring-shaped protrusions 23 disposed on the first portion 21 and the second portion 22. When the first case 11 is assembled and connected with the second case 12, the first portion 21 is assembled and connected with the second portion 22, the first portion 21 covers on at least a part of the surface 31 of the cable 3, the second portion 22 covers on at least a part of the surface 31 of the cable 3. Consequently, the strain relief structure 2 surrounds the cable 3, and the strain relief structure 2 is clamped between the cable 3 and the outer casing 1. The plurality of first ring-shaped protrusions 23 are detachably attached on the surface 31 of the cable 3. When the cable 3 is bent by an external force, the strain relief structure 2 generates a supporting force in correspondence to the bending stress, so as to prevent the cable 3 from being excessively bent and broken. Moreover, since the first case 11, the first portion 21, the second case 12 and the second portion 22 are respectively detachably assembled on the cable 3, it is unnecessary to apply a lubricating oil to the inner edge of the strain relief structure before assembling, and the advantages of simplifying the process of production and saving time-cost of manually assembling are achieved.

In an embodiment, the cable 3 of the charging gun 100 is configured for transmitting electrical power, wherein the cable 3 has a first end (not shown) and a second end (not shown). The first end and the second end are two opposite ends of the cable 3, wherein the first end is electrically coupled with a power supply device (not shown), wherein the power supply device may be but not limited to a charging pile. The second end has a connector (not shown) configured to be electrically coupled with an external device (not shown), and the external device may be but not limited to an electric vehicle. When the connector is electrically coupled with the external device, the electrical power is transmitted to the external device by the power supply device through the cable 3, so that the external device is charged.

Please refer to FIGS. 2 and 3. In the present embodiment, each of the first portion 21 and the second portion 22 of the strain relief structure 2 are a curved sheet structure with semi-ring shaped cross section. When the first portion 21 and the second portion 22 are assembled with each other, the ring-shaped strain relief structure 2 is therefore formed, but not limited thereto. In the present embodiment, the first portion 21 of the strain relief structure 2 includes a first inner surface 21a and a first outer surface 21b. The first inner surface 21a and the first outer surface 21b are two opposite surfaces of the first portion 21. The second portion 22 of the strain relief structure 2 includes a second inner surface 22a and a second outer surface 22b. The second inner surface 22a and the second outer surface 22b are two opposite surfaces of the second portion 22. The first outer surface 21b of the first portion 21 of the strain relief structure 2 matches the first inner wall 11a of the first case 11 of the outer casing 1, and the second outer surface 22b of the second portion 22 of the strain relief structure 2 matches the second inner wall 12a of the second case 12 of the outer casing 1. The first case 11 and the second case 12 of the outer casing 1 are assembled by an external force, and the outer casing 1 is pressured on and tightly joined to the strain relief structure 2, so as to prevent water or liquid from flowing into the charging gun 100 via the gap between the outer casing 1 and the strain relief structure 2, and the waterproof effect is therefore enhanced.

Please refer to FIGS. 2 to 4. In the present embodiment, as shown in FIG. 3, the first inner surface 21a of the first portion 21 of the strain relief structure 2 has a plurality of first protrusions 23a, wherein the plurality of first protrusions 23a are semi-annular convex structures protruded outwardly form the first inner surface 21a, and the plurality of first protrusions 23a are arranged adjacent to and apart from each other. As shown in FIG. 2, the second inner surface 22a of the second portion 22 of the strain relief structure 2 has a plurality of second protrusions 23b, wherein the plurality of second protrusions 23b are semi-annular convex structures protruded outwardly form the second inner surface 22a, and the plurality of second protrusions 23b are arranged adjacent to and apart from each other. When the first portion 21 and the second portion 22 of the strain relief structure 2 are assembled and connected with each other, the plurality of first protrusions 23a are respectively assembled and connected with the corresponding one of the second protrusions 23b, and the plurality of first ring-shaped protrusions 23 are formed thereto. When the strain relief structure 2 covers on the cable 3, the plurality of first ring-shaped protrusions 23 are attached on the surface 31 of the cable 3. By the arrangement of the plurality of first ring-shaped protrusions 23, the cable 3 and the strain relief structure 2 are tightly combined with each other, so as to prevent water or liquid from flowing into the charging gun 100 via the gap between the outer casing 1 and the strain relief structure 2, and the waterproof effect is therefore enhanced.

Please refer to FIGS. 2 to 4. In the present embodiment, the first outer surface 21b of the first portion 21 of the strain relief structure 2 has a plurality of first recesses 24a, wherein the plurality of first recesses 24a are semi-annular groove structures recessed inwardly from the first outer surface 21b, and the plurality of first recesses 24a are arranged adjacent to and apart from each other. As shown in FIG. 3, the second outer surface 22b of the second portion 22 of the strain relief structure 2 has a plurality of second recesses 24b, wherein the plurality of second recesses 24b are semi-annular groove structures recessed inwardly from the second outer surface 22b, and the plurality of second recesses 24b are arranged adjacent to and apart from each other. When the first portion 21 is assembled and connected with the second portion 22, the plurality of first recesses 24a are respectively assembled and connected with the corresponding one of the second recesses 24b, and the plurality of ring-shaped recesses 24 are formed thereto.

Please refer to FIGS. 2 to 4. In the present embodiment, as shown in FIG. 3, the first inner wall 11a of the outer casing 1 has a plurality of third protrusions 13a, wherein the plurality of third protrusions 13a are semi-annular convex structures protruded outwardly form the first inner wall 11a, and the plurality of third protrusions 13a are arranged adjacent to and apart from each other. The second inner wall 12a of the outer casing 1 has a plurality of fourth protrusions 13b, wherein the plurality of fourth protrusions 13b are semi-annular convex structures protruded outwardly form the second inner wall 12a, and the plurality of fourth protrusions 13b are arranged adjacent to and apart from each other. When the first case 11 and the second case 12 of the outer casing 12 are assembled and connected with each other, the first portion 21 and the second portion 22 of the strain relief structure 2 are assembled and connected with each other, and the plurality of third protrusions 13a are respectively assembled and connected with the corresponding one of the fourth protrusions 13b, and a plurality of second ring-shaped protrusions 13 are formed thereto.

Please refer to FIGS. 2 to 4. In the present embodiment, the number of the plurality of second ring-shaped protrusions 13 is equal to the number of the plurality of second recesses 24, and the positions of the plurality of second ring-shaped protrusions 13 are also correspond to the plurality of second recesses 24. Therefore, the plurality of second ring-shaped protrusions 13 are detachably disposed within the corresponding one of the ring-shaped recesses 24. Since the plurality of second ring-shaped protrusions 13 are disposed within the corresponding one of the ring-shaped recesses 24, the strain relief structure 2 and the outer casing are tightly matched with each other, so as to prevent water or liquid from flowing into the charging gun 100 via the gap between the outer casing 1 and the strain relief structure 2, and the waterproof effect is therefore enhanced. The number and arrangement of the plurality of ring-shaped recesses 24 and the plurality of second ring-shaped protrusions 13 are not limited to the above embodiment, which can be changed according to the practical requirements. In the present embodiment, the strain relief structure 2 is made of a waterproof material, such as rubber, but not limited thereto.

Please refer to FIGS. 1, 4 and 5. In the present embodiment, the strain relief structure 2 is disposed adjacent to an end 10 of the outer casing 1, and the outer casing 1 completely covers the strain relief structure 2. In other words, the strain relief structure 2 is not exposed outside the opening of the end 10 of the outer casing 1. Since the outer casing 1 completely covers the strain relief structure 2, the deformation amplitude of the strain relief structure 2 is limited, and the risk of the cable 3 being excessively bent and broken is reduced.

Please refer to FIGS. 2 and 3. In the present embodiment, the outer casing 1 of the charging gun 100 further includes a plurality of fixing components 14, wherein the plurality of fixing components 14 are configured for fixing the first case 11 and the second case 12, but not limited thereto. Each of the fixing components 14 includes a first fixing part 14a and a second fixing part 14b. The first fixing part 14a is disposed on the first case 11, the second fixing part 14b is disposed on the second case 12. When the first case 11 is assembled and connected with the second case 12, the first fixing part 14a and the second fixing part 14b are connected with each other, and the first case 11 is fixed to the second case 12, so as to prevent the first case 11 and the second case 12 from being bounced off by the pressure applied to the strain relief structure 2. In the present embodiment, as shown in FIG. 3, the first fixing part 14a of the fixing component 14 is disposed on the first inner wall 11a of the first case 11, and as shown in FIG. 2, the second fixing part 14b of the fixing component 14 is disposed on the second inner wall 12a of the second case 12. The first fixing part 14a and the second fixing part 14b are connected with each other in a snap-fit manner to fix the first case 11 and the second case 12, but not limited thereto. In some embodiments, The first fixing part 14a and the second fixing part 14b may be connected with each other in magnetic fixing or tight fitting manners, but not limited thereto.

Please refer to FIGS. 1 to 5. Since the outer casing 1 and the strain relief structures 2 of the charging gun 100 of the present embodiment are detachably assembled on the cable 3, the advantages of simplifying the process of production, enhancing the efficiency of production, and enhancing the effect of waterproof are achieved. First of all, the first portion 21 of the strain relief structures 2 is disposed within the first case 11 of the outer casing 1, wherein the first portion 21 and the first case 11 are curved sheet structures with semi-ring shaped cross section, and the first outer surface 21b of the first portion 21 is matched with the first inner wall 11a of the first case 11, so that the first portion 21 is tightly assembled with the first case 11. The second portion 22 of the strain relief structures 2 is disposed within the second case 12 of the outer casing 1, wherein the second portion 22 and the second case 12 are curved sheet structures with semi-ring shaped cross section, and the second outer surface 22b of the second portion 22 is also matched with the second inner wall 12a of the second case 12, so that the second portion 22 is tightly assembled with the second case 12. Next, the first case 11 and the first portion 21 are correspondingly assembled and connected to the second case 12 and the second portion 22, so that the first portion 21 and the second portion 22 covers on the cable 3. Finally, the first case 11 and the second case 12 are combined by applying an external force, and they are fixed by the plurality of fixing components 14. Therefore, the strain relief structure 2 is clamped between the outer casing 1 and the cable 3, the strain relief structure 2 is tightly combined with the outer casing 1 to enhance the effect of waterproof, and the strain relief structure 2 is also tightly combined with the cable 3 to enhance the effect of waterproof. Since the outer casing 1 and the strain relief structures 2 are detachably assembled on the cable 3, the advantages of simplifying the process of production, enhancing the efficiency of production, and enhancing the effect of waterproof are achieved.

In summary, the present disclosure provides a charging gun. Since the first case of the outer casing, the first portion of the strain relief structure, the second case of the outer casing and the second portion of the strain relief structure are detachably assembled on the cable, it is unnecessary to apply a lubricating oil to the inner edge of the strain relief structure before assembling, and the advantages of simplifying the process of production and saving time-cost of manually assembling are achieved. In addition, the strain relief structure matches the outer casing, and the outer casing pressures on and tightly joined to the strain relief structure, so as to prevent water or liquid from flowing into the charging gun via the gap between the outer casing and the strain relief structure, and the waterproof effect is therefore enhanced. Consequently, the arrangement of the plurality of first ring-shaped protrusions is benefit in that the cable and the strain relief structure can be tightly combined with each other, so as to prevent water or liquid from flowing into the charging gun via the gap between the outer casing and the strain relief structure, and the waterproof effect is therefore enhanced.

While the disclosure has been described in terms of what is presently considered to be the most practical and preferred embodiments, it is to be understood that the disclosure needs not be limited to the disclosed embodiment.

What is claimed is:

1. A charging gun, comprising:
   a cable having a surface;
   an outer casing comprising a first case and a second case, wherein the first case is detachably assembled with the second case; and
   a strain relief structure comprising a first portion and a second portion, wherein the first portion is detachably assembled with the second portion, the first portion is disposed on a first inner wall of the first case, and the second portion is disposed on a second inner wall of the second case;
   wherein when the first case is assembled and connected with the second case, the first portion is assembled and connected with the second portion, the first portion covers on at least a part of the surface of the cable, the second portion covers on at least a part of the surface of the cable, and the strain relief structure is clamped between the cable and the outer casing, wherein a first outer surface of the first portion of the strain relief structure has a plurality of first recesses, a second outer surface of the second portion of the strain relief structure has a plurality of second recesses, wherein when the first portion is assembled and connected with the second portion, the plurality of first recesses are respectively assembled with the corresponding one of the second recesses, and a plurality of ring-shaped recesses are formed thereto.

2. The charging gun according to claim 1, wherein the first outer surface of the first portion matches the first inner wall of the first case, and the second outer surface of the second portion matches the second inner wall of the second case.

3. The charging gun according to claim 1, wherein the first inner wall of the outer casing has a plurality of third protrusions, the second inner wall has a plurality of fourth protrusions, when the first portion and the second portion of the strain relief structure are assembled with each other, the plurality of third protrusions are respectively assembled with the corresponding one of the fourth protrusions, and a plurality of second ring-shaped protrusions are formed thereto, wherein the plurality of second ring-shaped protrusions are detachably disposed within the corresponding one of the ring-shaped recesses.

4. The charging gun according to claim 1, wherein a first inner surface of the first portion of the strain relief structure has a plurality of first protrusions, a second inner surface of the second portion has a plurality of second protrusions, when the first portion and the second portion are assembled with each other, the plurality of first protrusions are respectively assembled with the corresponding one of the second protrusions, and a plurality of first ring-shaped protrusions are formed thereto, wherein the plurality of first ring-shaped protrusions are detachably attached with the surface of the cable.

5. The charging gun according to claim 1, wherein the outer casing completely covers the strain relief structure.

6. The charging gun according to claim 1, wherein the strain relief structure is disposed adjacent to an end of the outer casing.

7. The charging gun according to claim 1, wherein the outer casing further comprises at least one fixing component, the at least one fixing component comprises a first fixing part and a second fixing part, the first fixing part is disposed on the first case, the second fixing part is disposed on the second case, wherein when the first case is assembled and connected with the second case, the first fixing part and the second fixing part are connected with each other, and the first case is fixed to the second case.

8. A strain relief structure for a charging gun, wherein the charging gun comprises a cable and an outer casing, the outer casing comprises a first case and a second case, the first case is detachably assembled with the second case, and the strain relief structure comprises:
  a first portion;
  a second portion detachably assembled with the first portion; and
  a plurality of first ring-shaped protrusions disposed on the first portion and the second portion;
  wherein the first portion is assembled and connected with the second portion, the first portion covers on at least a part of a surface of the cable, the second portion covers on at least a part of the surface of the cable, and the plurality of first ring-shaped protrusions are detachably attached on the surface of the cable, wherein a first outer surface of the first portion has a plurality of first recesses, a second outer surface of the second portion has a plurality of second recesses, wherein when the first portion is assembled and connected with the second portion, the plurality of first recesses are respectively assembled with the corresponding one of the second recesses, and a plurality of ring-shaped recesses are formed thereto.

9. The strain relief structure according to claim 8, wherein the first outer surface of the first portion matches the first inner wall of the first case, and the second outer surface of the second portion matches the second inner wall of the second case.

10. The strain relief structure according to claim 8, wherein plurality of ring-shaped recesses are configured for respectively accommodating corresponding one of second protrusions of the outer casing.

11. The strain relief structure according to claim 8, wherein a first inner surface of the first portion of the strain relief structure has a plurality of first protrusions, a second inner surface of the second portion has a plurality of second protrusions, wherein when the first portion and the second portion are assembled with each other, the plurality of first protrusions are respectively assembled with the corresponding one of the second protrusions, and the plurality of first ring-shaped protrusions are formed thereto.

12. The strain relief structure according to claim 8, the strain relief structure is made of a waterproof material.

\* \* \* \* \*